United States Patent
Vora et al.

(10) Patent No.: US 10,443,523 B2
(45) Date of Patent: Oct. 15, 2019

(54) SUPERVISORY CONTROL SYSTEM TO SELECT PTO CLUTCH ENGAGEMENT METHOD BASED ON REAL-TIME INERTIAL LOAD ESTIMATION

(71) Applicant: CNH Industrial America LLC, New Holland, PA (US)

(72) Inventors: Kushan Vora, Westmont, IL (US); Haibo Guo, Naperville, IL (US); Brian Allen Hartman, Valparaiso, IN (US)

(73) Assignee: CNH Industrial America LLC, New Holland, PA (US)

( * ) Notice: Subject to any disclaimer, the term of this patent is extended or adjusted under 35 U.S.C. 154(b) by 152 days.

(21) Appl. No.: 15/403,734

(22) Filed: Jan. 11, 2017

(65) Prior Publication Data
US 2017/0198768 A1  Jul. 13, 2017

Related U.S. Application Data

(60) Provisional application No. 62/277,408, filed on Jan. 11, 2016.

(51) Int. Cl.
*B60W 30/188* (2012.01)
*F16D 48/02* (2006.01)
(Continued)

(52) U.S. Cl.
CPC .............. *F02D 41/10* (2013.01); *A01B 71/06* (2013.01); *A01B 76/00* (2013.01); *B60K 17/02* (2013.01);
(Continued)

(58) Field of Classification Search
CPC .. B60W 30/1882; B60W 10/06; B60W 10/11;
B60W 2510/0666; B60W 2510/0638;
B60W 2710/1005; B60W 2510/1005;
B60W 2710/0677; F16D 25/14; F16D 48/06; F16D 48/066; F16D 2500/10437;
F16D 2500/3165; F16D 2500/30428;
F16D 2500/50287; F16D 2500/1027;
F16D 2500/111;
(Continued)

(56) References Cited

U.S. PATENT DOCUMENTS 5,099,936 A  3/1992  Irikura et al.
5,682,790 A  11/1997  Genise
(Continued)

FOREIGN PATENT DOCUMENTS

DE  102008014531 A1  9/2009
EP  0176529 A1  4/1986
EP  1285806 A2  2/2003

OTHER PUBLICATIONS

PCT International Search Report & Written Opinion for PCT Application No. PCT/US2018/013383 dated Apr. 17, 2018; 11 Pages.

*Primary Examiner* — Tinh T Dang
(74) *Attorney, Agent, or Firm* — Rickard K. DeMille; Rebecca L. Henkel

(57) ABSTRACT

A method for controlling power takeoff (PTO) clutch engagement includes determining an output clutch speed, adjusting a clutch current at a predetermined rate, estimating an inertial load of a PTO implement and adjusting the clutch current for one or more times at a time interval, and selecting a clutch control algorithm configured for the inertial load of the PTO implement.

16 Claims, 6 Drawing Sheets

(51) Int. Cl.
| | |
|---|---|
| F16D 48/06 | (2006.01) |
| F16H 61/02 | (2006.01) |
| B60W 10/06 | (2006.01) |
| B60W 10/02 | (2006.01) |
| B60K 17/02 | (2006.01) |
| B60K 17/28 | (2006.01) |
| B60K 25/02 | (2006.01) |
| F02D 29/02 | (2006.01) |
| F02D 31/00 | (2006.01) |
| F02D 41/10 | (2006.01) |
| F02D 41/26 | (2006.01) |
| A01B 71/06 | (2006.01) |
| A01B 76/00 | (2006.01) |
| B60W 10/11 | (2012.01) |
| F02D 41/14 | (2006.01) |
| F02D 41/02 | (2006.01) |
| F16H 59/14 | (2006.01) |

(52) U.S. Cl.
CPC .............. *B60K 17/28* (2013.01); *B60K 25/02* (2013.01); *B60W 10/06* (2013.01); *B60W 10/11* (2013.01); *B60W 30/1882* (2013.01); *F02D 29/02* (2013.01); *F02D 31/002* (2013.01); *F02D 41/26* (2013.01); *F16D 25/14* (2013.01); *F16D 48/06* (2013.01); *F16D 48/066* (2013.01); *F16H 61/0204* (2013.01); *F16H 61/0213* (2013.01); *B60W 2510/0638* (2013.01); *B60W 2510/0666* (2013.01); *B60W 2510/1005* (2013.01); *B60W 2710/0677* (2013.01); *B60W 2710/1005* (2013.01); *B60Y 2200/221* (2013.01); *F02D 41/023* (2013.01); *F02D 2041/1409* (2013.01); *F02D 2200/101* (2013.01); *F02D 2200/1004* (2013.01); *F16D 2500/1027* (2013.01); *F16D 2500/10437* (2013.01); *F16D 2500/111* (2013.01); *F16D 2500/30421* (2013.01); *F16D 2500/30426* (2013.01); *F16D 2500/30428* (2013.01); *F16D 2500/3165* (2013.01); *F16D 2500/5048* (2013.01); *F16D 2500/50287* (2013.01); *F16D 2500/50296* (2013.01); *F16D 2500/70418* (2013.01); *F16D 2500/70663* (2013.01); *F16D 2500/70673* (2013.01); *F16H 2059/147* (2013.01); *F16H 2061/0216* (2013.01); *F16H 2306/46* (2013.01); *F16H 2306/50* (2013.01)

(58) Field of Classification Search
CPC ... F16D 2500/70673; F16D 2500/5048; F16D 2500/50296; F16D 2500/70418; F16D 2500/70663; F16D 2500/30421; F16D 2500/30426; F16H 61/0204; F16H 61/0213; F16H 2061/0216; F16H 2059/147; F16H 2306/50; F16H 2306/46; B60K 17/02; B60K 17/28; B60K 25/02; F02D 29/02; F02D 31/002; F02D 41/10; F02D 41/26; F02D 41/023; F02D 2200/1004; F02D 2200/101; F02D 2041/1409; A01B 71/06; A01B 76/00; B60Y 2200/221

See application file for complete search history.

(56) References Cited

U.S. PATENT DOCUMENTS

| | | | |
|---|---|---|---|
| 6,080,081 A * | 6/2000 | Sauermann | B60K 17/28 180/53.1 |
| 6,129,187 A | 10/2000 | Bellanger et al. | |
| 6,134,494 A | 10/2000 | Stelzle et al. | |
| 6,564,915 B2 | 5/2003 | Lorentz et al. | |
| 7,048,106 B2 * | 5/2006 | Hou | B60W 30/1888 192/103 F |
| 8,417,426 B2 * | 4/2013 | Vermeulen | A01F 15/0841 701/50 |
| 2006/0116238 A1 | 6/2006 | Karlsson et al. | |
| 2008/0234102 A1 | 9/2008 | Karlsson et al. | |
| 2012/0221214 A1 | 8/2012 | Husson | |
| 2014/0136038 A1 | 5/2014 | Bissontz | |

* cited by examiner

SUPERVISORY CONTROL SYSTEM TO SELECT PTO CLUTCH ENGAGEMENT METHOD BASED ON REAL-TIME INERTIAL LOAD ESTIMATION

CROSS REFERENCE TO RELATED APPLICATION

This application is claims priority to and benefit from U.S. Provisional Application No. 62/277,408 to Prasse et al. filed Jan. 11, 2016, and incorporates the entirety of the same by reference herein.

BACKGROUND

The present disclosure relates generally to improving power takeoff (PTO) performance of a work vehicle. In particular, the present disclosure relates to improving PTO clutch engagement under different inertia implement loads using real time inertial load information.

The work vehicle may be coupled to a PTO implement via a PTO clutch. A controller of the work vehicle may apply a current to engage or disengage the PTO clutch. Typically, the current applied may be increased at a predetermined rate. However, if the inertial load of the PTO implement is too high, an engine of the work vehicle may stall and/or a service life of the PTO clutch may be reduced due to excessive clutch wear during engagement.

BRIEF DESCRIPTION

Certain embodiments commensurate in scope with the present disclosure are summarized below. These embodiments are not intended to limit the scope of the disclosure, but rather these embodiments are intended only to provide a brief summary of possible forms of the disclosure. Indeed, the disclosure may encompass a variety of forms that may be similar to or different from the embodiments set forth below.

In a first embodiment, a system of a work vehicle includes a power takeoff (PTO) system. The PTO system includes a PTO clutch that includes a clutch control solenoid valve that regulates supply of hydraulic fluid to the PTO clutch and controls engagement and disengagement of the PTO clutch based on a clutch current. The PTO system also includes a PTO output shaft coupled to the PTO clutch, wherein the PTO output shaft, in operation, is coupled to and drives a PTO implement. The system of the work vehicle also includes a controller that includes a supervisory control system communicatively coupled to the PTO clutch. The supervisory control system includes a first clutch control logic configured for a first range of inertial loads and a second clutch control logic configured for a second range of inertial loads. The supervisory control system, in operation, determines an output clutch speed of the PTO clutch. The supervisory control system also, in operation, adjusts the clutch current at the PTO clutch at a predetermined rate. The supervisory control system further, in operation, estimates an inertial load of the PTO implement and adjusts the clutch current for one or more times at a time interval. The supervisory control system also, in operation, selects the first control clutch logic when the estimate is within the first range of inertial loads. The supervisory control system further, in operation, selects the second control clutch logic when the estimate is within the second range of inertial loads.

In a second embodiment, a tangible, non-transitory, machine-readable-medium includes machine-readable instructions to determine an output clutch speed of a power takeoff (PTO) clutch of a work vehicle. The tangible, non-transitory, machine-readable-medium also includes machine-readable instructions to adjust a clutch current at the PTO clutch at a predetermined rate. The tangible, non-transitory, machine-readable-medium further includes machine-readable instructions to estimate an inertial load of a PTO implement and adjust the clutch current for one or more times at a time interval. The tangible, non-transitory, machine-readable-medium also includes machine-readable instructions to select a first clutch control algorithm configured for a first range of inertial loads when the estimate is within the first range of inertial loads. The tangible, non-transitory, machine-readable-medium further includes machine-readable instructions to select a second clutch control algorithm configured for a second range of inertial loads when the estimate is within the second range of inertial loads.

In a third embodiment, a method for controlling power takeoff (PTO) clutch engagement includes determining an output clutch speed, adjusting a clutch current at a predetermined rate, estimating an inertial load of a PTO implement and adjusting the clutch current for one or more times at a time interval, and selecting a clutch control logic configured for the inertial load of the PTO implement.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
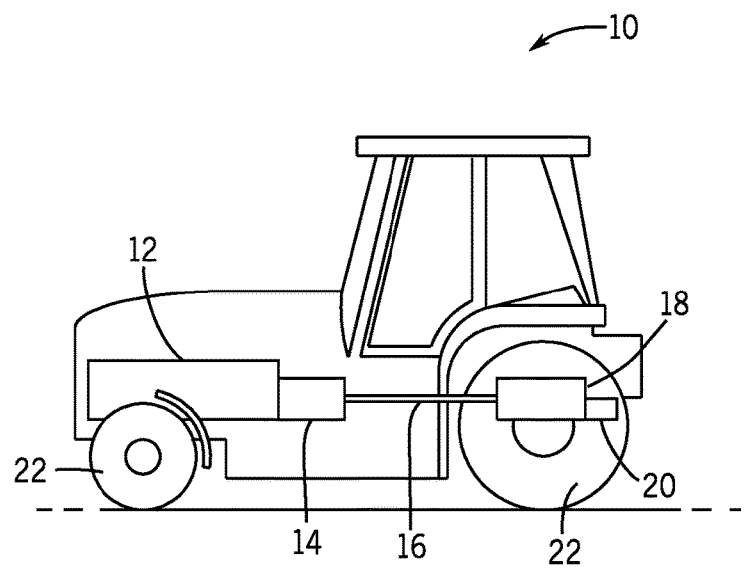
FIG. 1 is a diagram of a work vehicle in accordance with an embodiment of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

The present disclosure relates generally to improving operation of a work vehicle with power takeoff (PTO) capability. In particular, the present disclosure relates to improving PTO clutch engagement of the work vehicle. Typically, to engage the PTO clutch, the current applied to a PTO clutch controlling solenoid is increased at a predetermined rate. However, if the inertial load of the PTO implement is too high, an engine of the work vehicle may stall and/or a lifetime of the PTO clutch may be reduced due to excessive clutch slippage during engagement. It may thus be desirable to determine the inertial load of the PTO implement and adjust or modify the current at the PTO clutch based on the inertial load such that the current or the rate of increase of the current at the PTO clutch may not be too high or too low. While the present disclosure discusses using current to drive a pressure reducing solenoid valve to engage the PTO clutch, it should be understood that any suitable technique may be used to control engagement of the PTO clutch, such as hydraulic means to control engagement of a hydraulically-actuated PTO clutch.

A supervisory control system may be used to achieve successful power takeoff (PTO) engagement for multiple ranges of implement inertial loads connected to the PTO system. The supervisory control system selects an appropriate PTO clutch engagement method based on real-time estimation of moment of inertia at a clutch output shaft. For example, the supervisory control system may select any control logic, such as different control algorithms and/or different sets of control parameters based on time, target PTO output shaft speed, and/or target PTO output shaft acceleration. Accordingly, systems and methods are disclosed in which a PTO clutch engagement control logic is selected based on inertial load of a PTO implement connected to the work vehicle. In particular, one embodiment of the present disclosure includes a system of a work vehicle includes a power takeoff (PTO) system including a PTO clutch and a PTO output shaft coupled to the PTO clutch, wherein the PTO output shaft, in operation, is coupled to and drives a PTO implement. The system also includes a controller that has a supervisory control system communicatively coupled to the PTO clutch, wherein the supervisory control system includes a first clutch control logic configured for a first range of inertial loads and a second clutch control logic configured for a second range of inertial loads. The supervisory control system, in operation, determines an output clutch speed of the PTO clutch. The supervisory control system, in operation, also adjusts a clutch current at the PTO clutch at a predetermined rate. The supervisory control system, in operation, further estimates an inertial load of the PTO implement and adjusts the clutch current for one or more times at a time interval. The supervisory control system, in operation, also selects the first clutch control logic when the estimate is within the first range of inertial loads. The supervisory control system, in operation, further selects the second clutch control logic when the estimate is within the second range of inertial loads.

FIG. 1 is a diagram of a work vehicle (e.g., a tractor 10), including an engine 12, a transmission 14, an output shaft 16 of the engine 12, and a power takeoff (PTO) system 18, in accordance with an embodiment of the present disclosure. The transmission 14 is coupled to the engine 12 to transfer power from the engine 12 to the output shaft 16 of the engine 12, which powers wheels 22 of the work vehicle 10. The PTO system 18 is coupled to the output shaft 16 of the engine 12, such that the output shaft 16 of the engine 12 drives a PTO input shaft of the PTO system 18 when a PTO clutch of the PTO system 18 is engaged. The PTO system 18 includes a PTO output shaft 20 (e.g., which may extend from a gear train), and the output shaft 16 of the engine 12 drives the PTO output shaft 20 when the PTO clutch is engaged.

Figure 2:
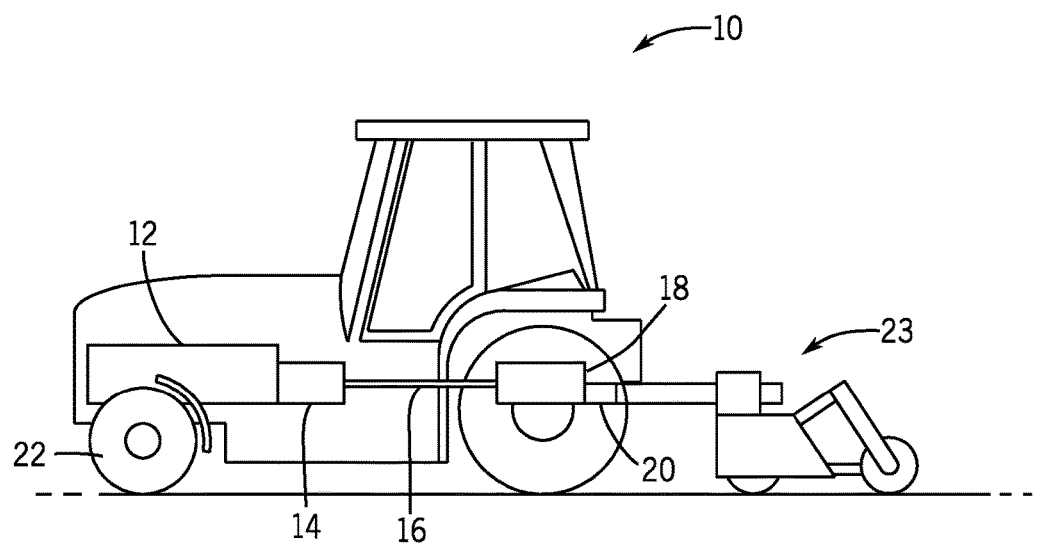
FIG. 2 is a diagram of work vehicle of FIG. 1 coupled to a power takeoff (PTO) implement in accordance with an embodiment of the present disclosure.

FIG. 2 is a diagram of a work vehicle 10 coupled to a PTO implement 23, in accordance with an embodiment of the present disclosure. The PTO implement 23 may generally correspond to any suitable implement configured to be coupled to a given work vehicle 10. For example, the PTO implement 23 may be a wheel rake, baler, mower, seeder, baler, grinder mixer, auger, drill, blower, feeder, or any other rotary powered implement. The PTO implement 23 may be coupled to the PTO output shaft 20 such that the PTO output shaft 20 drives certain components on the PTO implement 23 when the PTO clutch of the PTO system 18 is engaged.

Figure 3:
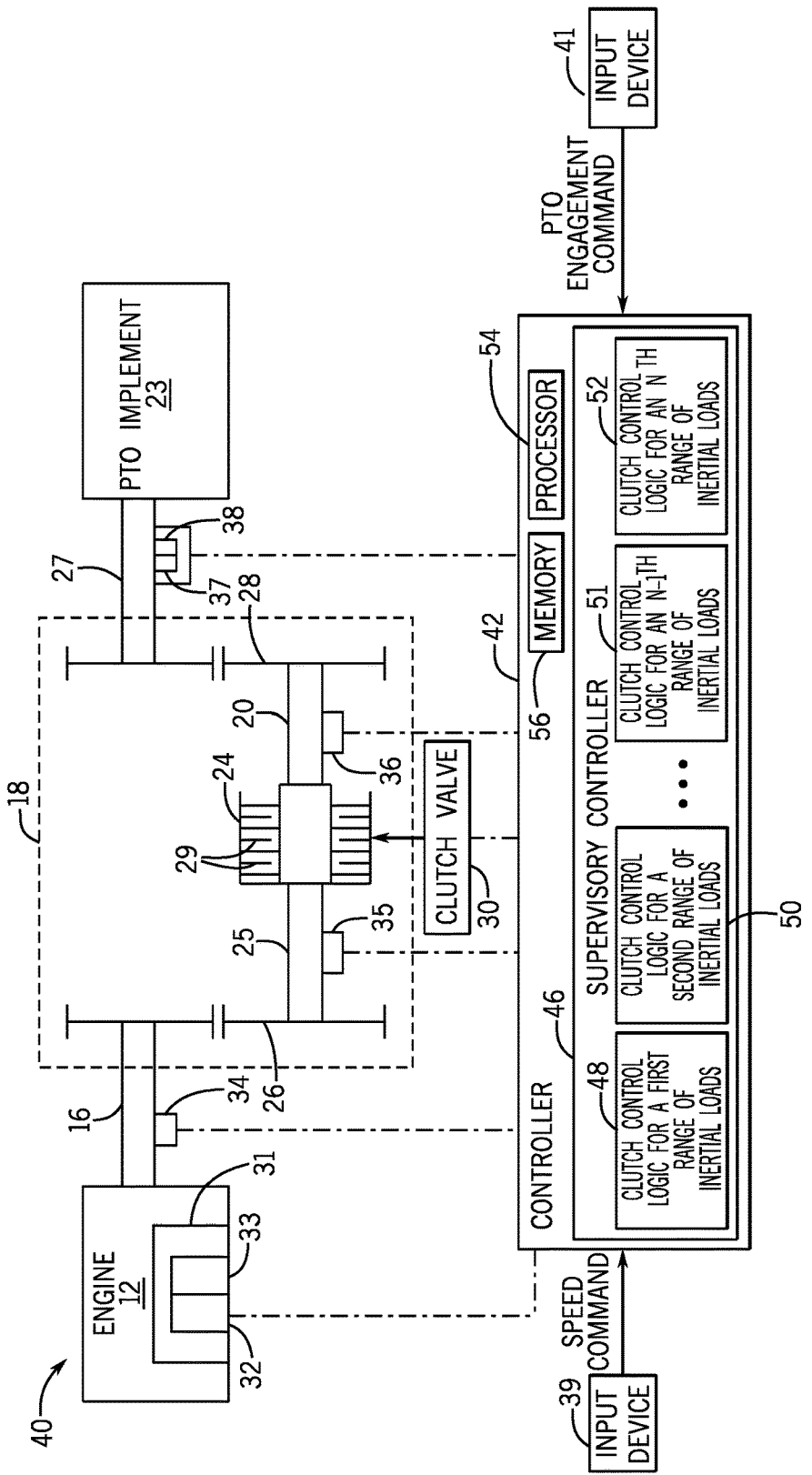
FIG. 3 is a block diagram of a control system that may be employed with the work vehicle of FIG. 1 and/or FIG. 2, in accordance with an embodiment of the present disclosure.

FIG. 3 is a block diagram of a control system 40 that may be employed within the work vehicle 10 of FIG. 1 and/or FIG. 2 in accordance with an embodiment of the present disclosure. The control system 40 may include the engine 12 rotatably coupled to the PTO implement 23 via the PTO system 18. In general, the PTO system 18 may be configured to transfer power from the engine 12 to the PTO implement 23 so as to rotationally drive the PTO implement 23.

The PTO system 18 may include a PTO clutch 24 configured to selectively couple the engine 12 to the corresponding PTO implement 23. Specifically, as shown in the illustrated embodiment, an output shaft 16 of the engine 12 may be rotatably coupled to a PTO input shaft 25 of the PTO clutch 24 (e.g., via one or more PTO input gears 26), which is, in turn, configured to be rotatably engaged with a corresponding PTO clutch output shaft 20 of the PTO system 18 via the PTO clutch 24. Additionally, the PTO output shaft 20 may be rotatably coupled to a corresponding implement input shaft 27 (e.g., via one or more PTO output gears 28). Thus, by engaging the PTO clutch 24 such that the PTO clutch input and output shafts 25, 20 are rotatably coupled to one another, power from the engine 12 may be transmitted through the PTO system 18 to the PTO implement 23. Similarly, power transmission from the engine 12 to the PTO implement 23 may be cut-off by disengaging the PTO clutch 24 such that the PTO clutch input and output shafts 25, 20 are effectively decoupled from one another. As is generally understood, the PTO clutch 24 may include a plurality of PTO clutch plates 29 configured to be engaged within the PTO clutch 24 for transmitting torque between the PTO clutch input and output shafts 25, 20.

In several embodiments, the PTO clutch 24 may correspond to a hydraulically-actuated clutch. Thus, as shown in FIG. 3, the system 40 may also include a clutch valve 30 (e.g., a current-controlled pressure reducing valve) configured to regulate the supply of hydraulic fluid to the PTO clutch 24, thereby allowing for the engagement and disengagement of the PTO clutch 24 to be controlled. In some embodiments, the clutch valve 30 may be a clutch control solenoid valve. For example, as will be described below, the current supplied to the clutch valve 30 may be directly proportional to the pressure of the hydraulic fluid supplied to the PTO clutch 24, which is, in turn, proportional to the amount of torque transmitted through the PTO clutch 24.

It should be appreciated that the configuration of the PTO system 18 shown in FIG. 3 is simply provided to illustrate one example of a suitable PTO configuration. In general, the systems and methods described herein may apply to control clutch engagement of a PTO system having any suitable configuration that allows power to be transmitted from an engine of a work vehicle to an associated implement, including any of the various PTO system configurations currently known in the art. It should also be appreciated that a work vehicle may be configured to have multiple PTO systems. For example, a work vehicle may include both a front PTO system for transferring power from the engine to an implement positioned in the front of the vehicle and a rear PTO system for transferring power from the engine to an implement positioned in the rear of the vehicle. In addition, PTO systems may also include more than one PTO clutch.

As shown in FIG. 3, the system 40 may also include a controller 42 configured to control the operation of one or more components of the work vehicle 10, such as the engine 12 and the PTO clutch 24. For example, the controller 42 may be communicatively coupled to an engine governor 31 in order to control and/or monitor the speed and/or torque of the engine 12. Similarly, the controller 42 may be communicatively coupled to the clutch valve 30 in order to control the operation of the PTO clutch 24. For instance, the controller 42 may be configured to transmit suitable current commands to the clutch valve 30 for controlling the engagement and/or disengagement of the PTO clutch 24.

It should also be appreciated that the controller 42 may correspond to an existing controller of the work vehicle 10 (e.g., an existing engine and/or transmission controller) or the controller 42 may correspond to a separate controller. For instance, in one embodiment, the controller 42 may form all or part of a separate plug-in module that may be installed within the work vehicle 10 to allow for the disclosed system and method to be implemented without requiring additional software to be uploaded onto existing control devices of the work vehicle 10. In addition, the controller 42 may also include various other suitable components, such as a communications circuit or module, one or more input/output channels, a data/control bus and/or the like.

The system 40 may also include one or more sensors for monitoring various operating parameters of the work vehicle 10. For example, as shown in FIG. 3, the controller 42 may be communicatively coupled to various sensors, such as a torque sensor 32 and/or a speed sensor 33, mounted on and/or within the engine 12 for monitoring the engine torque loads and/or the engine speed. In one embodiment, the sensor(s) 32, 33 may comprise an internal sensor of the engine governor 31. In another embodiment, the system 40 may include any other suitable sensor(s) configured to monitor the torque loads and/or the speed of the engine 12. For instance, a suitable sensor 34 may be provided in association with the output shaft 16 of the engine 12 for monitoring the current engine speed. Regardless, by monitoring the engine torque and the engine speed via the sensor(s), the controller 42 may be allowed to continuously calculate the current engine power and engine load of the engine 12.

Moreover, the system 40 may also include one or more sensors 35, 36 (e.g., shaft encoders, shaft sensors and/or any other suitable speed sensors) configured to monitor the rotational speeds of the various shafts of the PTO system 18. For example, as shown in FIG. 3, the system 40 may include a first speed sensor 35 mounted to and/or within the PTO input shaft 25 for monitoring the input speed of the PTO system 18 and a second speed sensor 36 mounted to and/or within the PTO output shaft 20 for monitoring the output speed of the PTO system 18. The speed sensors 35, 36 may, in turn, be communicatively coupled to the controller 42 to permit the speed measurements to be transmitted to the controller 42 for subsequent processing and/or analysis. In other embodiments, as an alternative to including the first speed sensor 35, the input speed of the PTO system 18 may be determined based on the engine speed. For instance, by knowing the gear ratio provided between the engine output shaft 16 and the PTO input shaft 25, the input speed of the PTO system 18 may be calculated based on the monitored engine speed.

In addition, the system 40 may include various other sensors configured to monitor any other suitable operating parameters of the work vehicle 10. In some embodiments, a speed sensor 37 may be associated with the PTO output shaft 20 and/or the input shaft 25 associated with the PTO implement 23 for monitoring the speed of the PTO output shaft 20 and/or the input shaft 25. For example, the speed sensor 37 may monitor the rotational speed of the PTO output shaft 20. The speed sensor 37 may be any type of sensor that is capable to detect a shaft or gear rotational speed, such as magnetic pickup and hall-effect sensors. In some embodiments, a torque sensor 38 may monitor the torque transmitted through the PTO system 18 to the PTO implement 23. In some embodiments, the sensors 37, 38 may be associated with the PTO implement 23 and monitor the speed and/or torque in the PTO implement 23.

As shown in FIG. 3, the system 40 may also include one or more input devices 39, 41 communicatively coupled to the controller 42 to allow operator inputs to be provided to the system 40. For example, as indicated above, the work vehicle 10 may include an input device 39 (e.g., a button, switch, dial, lever, touchscreen input, or other suitable input device) configured to permit an operator to input a speed command corresponding to a target engine speed for the work vehicle 10. Upon receipt of the speed command, the controller 42 may be configured to control the operation of the engine 12 in order to achieve the commanded engine speed. Similarly, as indicated above, the work vehicle 12 may include a suitable input device 41 (e.g., a button, switch, dial, lever, touchscreen input, or other suitable input device) to allow the operator to input a PTO-related command for engaging and/or disengaging the PTO clutch 24. For instance, upon receipt of a PTO engagement input from the operator, the controller 42 may be configured to control the operation of the clutch valve 30 so as to engage the PTO clutch 24, thereby allowing power to be transferred from the engine 12 to the associated PTO implement 23. As will be described below, to allow for such control of the clutch valve 30, the controller 42 may be configured to implement a suitable control logic for determining a current command(s) to be transmitted to the clutch valve 30 that takes into account the magnitude of the inertial load coming from the connected PTO implement 23. The suitable control logic may perform a suitable algorithm and/or select suitable parameters for an algorithm to enable the controller 42 to determine the current command(s) to be transmitted to the clutch valve 30. As such, a smooth PTO clutch engagement may be achieved regardless of whether the implement inertial load is relatively high or relatively low.

The controller 42 includes a supervisory control system or controller 46 that is used to engage and disengage the PTO clutch 24 in order to engage and disengage the PTO system 18. The supervisory controller 46 may be used to achieve successful power takeoff (PTO) engagement for multiple ranges of PTO implement inertial loads connected to the PTO system 18. The supervisory controller 46 monitors output shaft speed of the PTO clutch 24 and outputs a clutch current to drive a PTO clutch 24 solenoid to partially engage the PTO clutch 24 at a predetermined rate. The predetermined rate may be a predetermined "step," such that an approximately constant amount of clutch current or constant amount of increase of clutch current is used to drive the PTO clutch 24 solenoid for a discrete time interval. After the PTO output shaft 20 speed is detected and reaches a threshold, the supervisory controller 46, in operation, further estimates an inertial load of the PTO implement 23 for a number of times and takes the average of the estimated inertias for better accuracy while the clutch current is increased at the predetermined rate by the supervisory controller 46. The supervisory controller 46 includes on-board real time inertia load determination algorithm and appropriate decision of inertial load control logic selection. As such, the supervisory controller 46 selects an appropriate PTO clutch engagement method based on real-time estimation of moment of inertia at a clutch output shaft. For example, the supervisory control system may select any control logic, such as different control algorithms and/or different sets of control parameters based on time, shaft speed, and/or shaft acceleration. Each control logic may accept as an input the inertial load of the PTO implement 23. In some embodiments, each control logic may accept an estimation of or a means of estimates of inertial loads of the PTO implement 23. For example, a control algorithm may include an input for the inertial load of the PTO implement 23. A set of control parameters may include the inertial load of the PTO implement 23.

To successfully engage the PTO clutch 24, the supervisory controller 46 may modulate the current sent to the PTO clutch 24. For example, the selected control logic may use the average inertia information calculated by the supervisory controller 46 to modulate the PTO clutch 24 solenoid current to engage the PTO clutch 24. If the current at the PTO clutch 24 is excessive, two plates of the PTO clutch 24 may contact each other too quickly, which may lead to an increased impact of the two clutch plates and reducing the lifetime of the PTO clutch 24. On the other hand, if the current at the PTO clutch 24 is insufficient, the two plates of the PTO clutch 24 may contact each other too slowly, which may lead to the two clutch plates slipping and reducing the lifetime of the PTO clutch 24.

Typically, the current applied to the PTO clutch 24 controls engagement or disengagement of the PTO clutch 24, and may be increased at a predetermined rate. However, if the inertial load of the PTO implement 23 is too high, the engine 12 of the work vehicle 10 may stall and/or a service life of the PTO clutch 24 may be reduced due to excessive clutch wear during engagement. It may thus be desirable to determine the inertial load of the PTO implement 23 and adjust or modify the current at the PTO clutch 24 based on the inertial load such that the current at the PTO clutch 24 may not be too high or too low, and increase rotation of the PTO implement 23 smoothly to a commanded or target speed.

The supervisory controller 46 includes on-board, real time, inertia load determination and appropriate decision of PTO inertial load control logic selection, such as a first clutch control logic 48 configured for a first range of inertial loads, a second clutch control logic 50 configured for a second range of inertial loads, and an $N^{th}$ clutch control logic 52 configured for an $N^{th}$ range of inertial loads. The clutch control logics (e.g., 48, 50, 52) may be in any suitable form that implements the disclosed clutch control algorithm, such as an inertia-based clutch engagement controller. It should be noted that "N" may be any suitable number such that N clutch control logics configured for N ranges of inertial loads limit the inertial load of the PTO implement being too low or too high. For example, N may be 1, 5, 10, 25, 50, 100, 1000, etc. In some embodiments, the clutch control logic may include different control algorithms and/or different sets of control parameters based on time, speed of the PTO output shaft 20, and/or acceleration of the PTO output shaft 20. For example, the first clutch control logic 48 may be configured to perform a first clutch control algorithm configured for the first range of inertial loads, the second clutch control logic 50 may be configured to perform a second clutch control algorithm configured for the second range of inertial loads, and the $N^{th}$ clutch control logic 52 may be configured to perform an $N^{th}$ clutch control algorithm configured for an $N^{th}$ range of inertial loads. As another example, the first clutch control logic 48 may include a first set of parameters to be used in a clutch control algorithm, such that the clutch control algorithm using the first set of parameters is configured for the first range of inertial loads. The second clutch control logic 50 may include a second set of parameters to be used in the clutch control algorithm, such that the clutch control algorithm using the second set of parameters is configured for the second range of inertial loads. And the $N^{th}$ clutch control logic 52 may include an $N^{th}$ set of parameters to be used in the clutch control algorithm, such that the clutch control algorithm using the $N^{th}$ set of parameters is configured for the $N^{th}$ range of inertial loads. The clutch control logics (e.g., 48, 50, 52) may include respective inertial loads as inputs to the clutch control logics. For example, the first clutch control logic 48 may include at least a first inertial load (in the first range of inertial loads) as an input, the second clutch control logic 50 may include at least a second inertial load (in the second range of inertial loads) as an input, and so on.

In some embodiments, the speed and/or the acceleration of the PTO output shaft 20 may be determined by receiving a signal and/or information from a sensor (e.g., 37) that measures speed and/or acceleration of the PTO output shaft 20. For example, the sensor may be communicatively coupled to the PTO output shaft 20 and the supervisory controller 46. The supervisory controller 46 may employ the first clutch control logic 48 to send an appropriate current to the PTO clutch 24 when the inertial load of the PTO implement 23 is within the first range of inertial loads. The supervisory controller 46 may employ the second clutch control logic 50 to send an appropriate current to the PTO clutch 24 when the inertial load of the PTO implement 23 is within the second range of inertial loads. The supervisory controller 46 may employ a third clutch control logic (e.g., included in the $N^{th}$ clutch control logic 52) to send an appropriate current to the PTO clutch 24 when the inertial load of the PTO implement 23 is within a third range of inertial loads (e.g., included in the $N^{th}$ range of inertial loads). In some embodiments, the first range of inertial loads may be the lowest range of inertial loads, the second range of inertial loads may be the second lowest range of inertial loads, and so on.

It should be appreciated the controller 42 may generally include any suitable processor-based device known in the art. Thus, in some embodiments, the controller 42 includes a processor 54 (e.g., a microprocessor) that may execute software, such as software for controlling the work vehicle 10. Moreover, the processor 54 may include multiple microprocessors, one or more "general-purpose" microprocessors, one or more special-purpose microprocessors, and/or one or more application specific integrated circuits (ASICS), or some combination thereof. For example, the processor 54 may include one or more reduced instruction set (RISC) processors. The controller 42 may be include or couple to a memory device 56 that may store information such as control software 58, look up tables, configuration data, etc. The memory device 56 may include a tangible, non-transitory, machine-readable-medium, such as a volatile memory (e.g., a random access memory (RAM)) and/or a nonvolatile memory (e.g., a read-only memory (ROM)). The memory device 56 may store a variety of information and may be used for various purposes. For example, the memory device 56 may store machine-readable and/or processor-executable instructions (e.g., firmware or software) for the processor 54 to execute, such as instructions for controlling the work vehicle 10. The storage device(s) (e.g., nonvolatile storage) may include read-only memory (ROM), flash memory, a hard drive, or any other suitable optical, magnetic, or solid-state storage medium, or a combination thereof. The storage device(s) may store data (e.g., position data, identification data, etc.), instructions (e.g., software or firmware for controlling the haul vehicle, etc.), and any other suitable data. In some embodiments, the memory device 56 may store the supervisory controller, the first clutch control logic 48 configured for the first range of inertial loads, the second clutch control logic 50 configured for the second range of inertial loads, the $N^{th}$ clutch control logic 52 configured for the $N^{th}$ range of inertial loads, or any combination thereof, as part of the control software 58. The control software 58 may then be executed by the processor 54 to control engagement of the PTO clutch 24.

When the supervisory controller 46 begins to engage the PTO clutch 24 in order to engage the PTO system 18, the supervisory controller 46 may adjust (e.g., increase) current to the PTO clutch 24 at a predetermined rate. The predetermined rate may be a predetermined "step," such that an approximately constant amount of clutch current is delivered to the PTO clutch 24 for a discrete time interval. Once an output speed of the PTO clutch 24 exceeds a threshold clutch output speed, the adjustment (e.g., increase) in current may be continued for one or more small time intervals (i.e., 50 milliseconds). The one or more time intervals may be constant, such that the time interval does not change. The moment of inertia of the PTO implement 23 may be estimated at each of the one or more small time intervals using Equation 2 below. An average of several measured inertia values may be determined for more accurate measurements.

Clutch torque at a specific time may be determined by Equation 1:

$$J_{out} \frac{dw_{out}(t)}{dt} = \tau_{cl}(t) \quad (1)$$

Discretizing Equation 1 solves for inertial load:

$$J_{out} = \left( \frac{\Delta t}{w_{out}(t) - w_{out}(t - \Delta t)} \right) \cdot \tau_{cl}(t) \quad (2)$$

where:

$J_{out}$ is the inertial load or mass moment of inertia of the PTO implement 23;

$w_{out}(t)$ is a measured clutch output shaft speed at time t during engagement;

$w_{out}(t-\Delta t)$ is a measured clutch output shaft speed at time $t-\Delta t$ during engagement;

$\tau_{cl}(t)$ is the clutch torque at time t during the engagement;

t is a sample time of current measurement; and $\Delta t$ is a time interval between two samples.

In particular, Equation 2 estimates the inertial load of the PTO implement 23 by determining a difference between a measured clutch output shaft speed at the time t and a measured clutch output shaft speed at a time of an immediately previous time interval $t-\Delta t$, dividing the time interval by the difference; and multiplying the result of dividing the time interval by a clutch torque at the time t.

Based on the estimated inertial load, $J_{out}$, the supervisory control system may select the appropriate PTO clutch engagement logic. For example, if the estimated PTO load inertia ($J_{out}$) is within the first range of inertial loads (e.g., $J_0 \leq J_{out} \leq J_1$), the supervisory controller 46 may use the first clutch control logic 48. If the estimated PTO load inertia ($J_{out}$) is within the second range of inertial loads (e.g., $J_1 < J_{out} \leq J_2$), the supervisory controller 46 may use the second clutch control logic 50. If the estimated PTO load inertia ($J_{out}$) is within the $N^{th}$ range of inertial loads (e.g., $J_{n-1} < J_{out} \leq J_n$), the supervisory controller 46 may use the $N^{th}$ clutch control logic 52.

Figure 4:
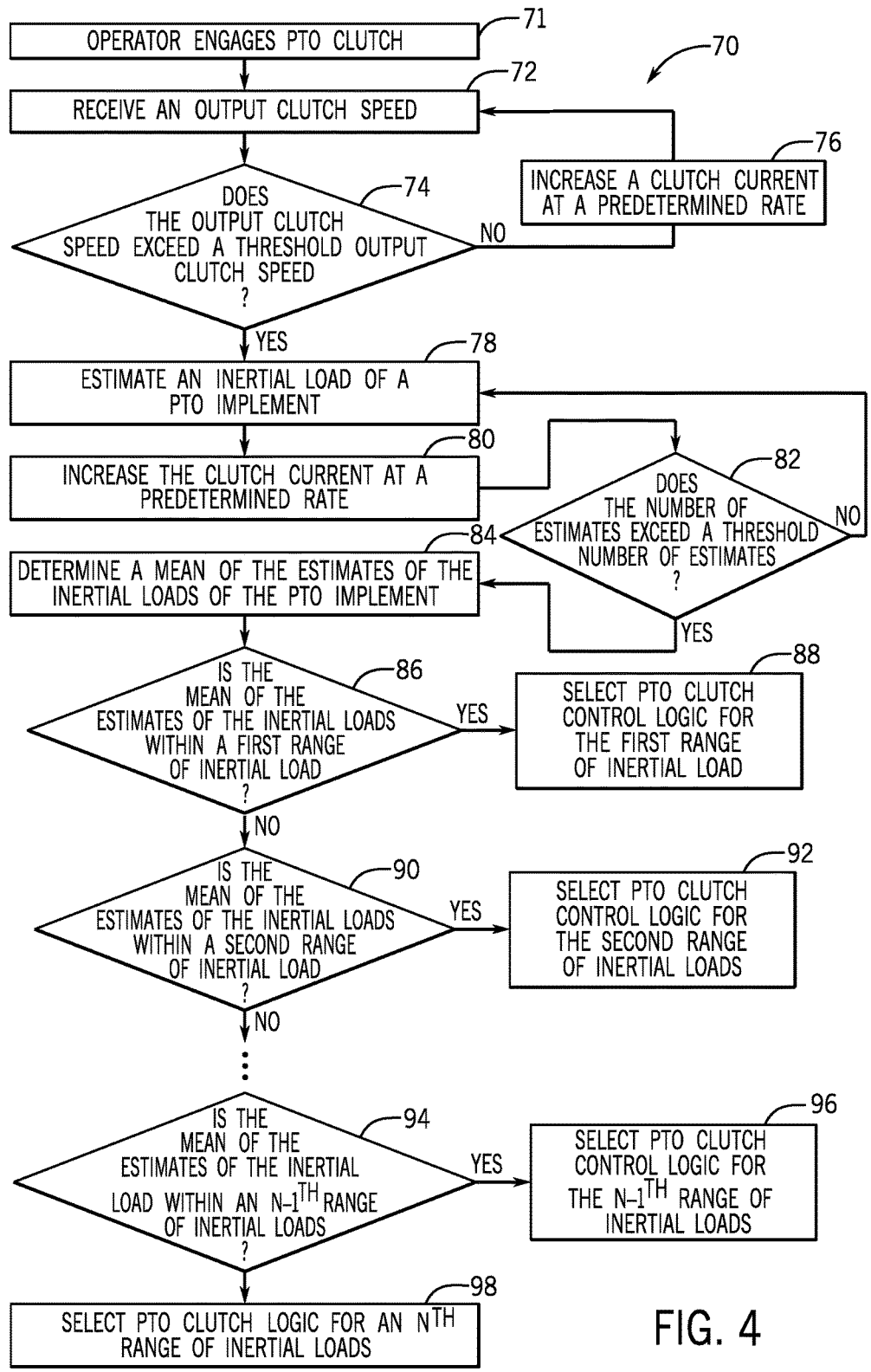
FIG. 4 is a flow diagram of a method for selecting appropriate PTO clutch engagement logic based on an inertial load of the PTO implement of FIG. 2, in accordance with an embodiment of the present disclosure.

FIG. 4 is a flow diagram of a method 70 for selecting appropriate PTO clutch engagement logic based on the inertial load of the PTO implement 23, in accordance with an embodiment of the present disclosure. An operator or user of the work vehicle (e.g., the tractor 10) engages (block 71) the PTO clutch 24 of the work vehicle 10. The operator may engage the PTO clutch 24 of the work vehicle 10 by providing input from the input device 41 (e.g., via a button, dial, switch, lever, touchscreen input, or any other suitable input device).

The supervisory controller 46 receives (block 72) an output clutch speed (e.g., from the speed sensor 37). The supervisory controller 46 may then adjust current to the PTO clutch 24, which adjusts the torque through the PTO clutch 24, at a predetermined rate. The predetermined rate may be a predetermined "step," such that an approximately constantly increasing rate of clutch current is delivered to the PTO clutch 24 for a discrete time interval. In some embodiments, the supervisory controller 46 may determine the output clutch speed by receiving information from the sensor 37 that measures speed of the PTO output shaft 20. The supervisory controller 46 determines (node 74) whether the output clutch speed exceeds a threshold output clutch speed. If not, the supervisory controller 46 adjusts (block 76) (e.g., increases) current to the PTO clutch 24, which adjusts the torque through the PTO clutch 24, at the predetermined rate. The supervisory controller 46 then returns to block 72 and restarts the method 70.

If the supervisory controller 46 determines (node 74) that the output clutch speed exceeds the threshold output clutch speed, then the supervisory controller 46 estimates (block 78) an inertial load of the PTO implement 23 connected at an end of the PTO output shaft 20. The supervisory controller 46 may estimate the inertial load based on a first measured clutch output shaft speed at a first time, a second measured clutch output shaft speed at a second time, and a clutch torque at the first time or second time. For example, the supervisory controller 46 may use Equation 2 to estimate the inertial load of the PTO implement 23. The clutch output shaft speed may be determined based on a sensor, such as the speed sensor 37 associated with the PTO output shaft 20. The clutch torque may be determined based on the current to the PTO clutch 24. In some embodiments, the clutch torque may be determined based on a sensor, such as the torque sensor 38 that monitors the torque transmitted through the PTO system 18 to the PTO implement 23.

The supervisory controller 46 then adjusts (block 80) (e.g., increases) the current to the PTO clutch 24 at a predetermined rate. The predetermined rate may be the same or different as the predetermined rate in block 76. The supervisory controller 46 may repeat blocks 78 and 80 for one or more time intervals such that the supervisory controller 46 estimates an inertial load of the PTO implement 23 for each time interval of the one or more time intervals. In some embodiments, the supervisory controller 46 may estimate the inertial load repeatedly, until a threshold number of estimates is met or exceeded. The time intervals may be relatively short (e.g., on the order of 10 milliseconds). For example, the time intervals may be 1, 5, 10, 25, 50, 75, 100, 150, or 200 milliseconds. The number of time intervals may be chosen based on that which is most beneficial to accuracy.

The supervisory controller determines (node 82) whether the number of estimates (e.g., from block 78) exceeds a threshold number of estimates. If not, the supervisory controller 46 returns to block 78 to perform another estimate. The threshold number of estimates may be any suitable number of estimates that results in an effective and/or accurate approximation of the inertial load of the PTO implement 23. For example, the threshold number of estimates may between 3 and 10 estimates (e.g., 5, 7, 8, estimates, and the like).

If the supervisory controller 46 determines that the number of estimates exceeds the threshold number of estimates, the supervisory controller 46 determines (block 84) a mean of the estimates of the inertial load of the PTO implement 23 (from block 78). In some embodiments, another calculation may be used instead of the mean, such as a median, a maximum, a minimum, etc.

The supervisory controller 46 may determine (node 86) whether the mean of the estimates ($J_{outavg}$) of the inertial load is within the first range of inertial loads (e.g., $J_0 \leq J_{outavg} \leq J_1$), wherein the first range includes zero (e.g., $J_0=0$). If so, the supervisory controller 46 selects (block 88) the first PTO clutch control logic 48 for this first range of inertial loads.

Otherwise, the supervisory controller 46 determines (node 90) whether the mean of the estimates ($J_{outavg}$) of the inertial load (from block 78) is within the second range of inertial loads (e.g., $J_1 < J_{outavg} \leq J_2$). If so, the supervisory controller 46 selects (block 92) the second PTO clutch control logic 50 for the second range of inertial loads.

Otherwise, the supervisory controller 46 determines (node 94) whether the mean of the estimates ($J_{outavg}$) of the inertial load (from block 78) is within an N-1$^{th}$ range of inertial loads (e.g., $J_{n-2} < J_{outavg} \leq J_{n-1}$). If so, the supervisory controller 46 selects (block 96) the N-1$^{th}$ PTO clutch control logic 51 for the N-1$^{th}$ range of inertial loads. It should be noted that there may be multiple nodes 94 and blocks 96 for the range of N PTO clutch control logics (e.g., 48, 50, 51, 52) configured for the N ranges of inertial loads. For example, there may be a third PTO clutch control logic for a third range of inertial loads, a fourth PTO clutch control logic for a fourth range of inertial loads, a fifth PTO clutch control logic for a fifth range of inertial loads, etc. It should be noted that "N" may be any suitable number such that N clutch control logics configured for N ranges of inertial loads. As such, it is contemplated that there may be total of two, three, five, ten, fifty, 100, 200, 500, 1000, and the like PTO clutch control logics for a corresponding number of ranges of inertial loads.

Figure 5:
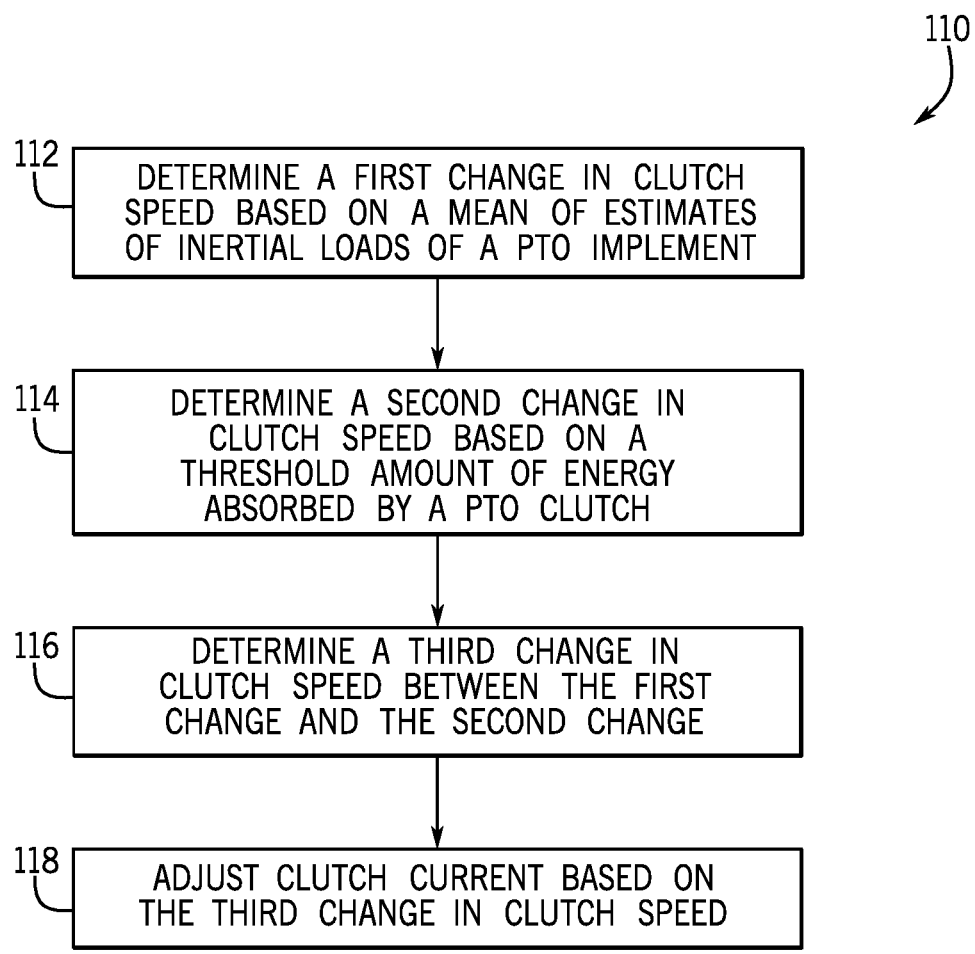
FIG. 5 is a flow diagram of a method for engaging a PTO clutch using a clutch control logic based on the inertial load of the PTO implement of FIG. 2, in accordance with an embodiment of the present disclosure.

FIG. 5 is a flow diagram of a method 110 for engaging a PTO clutch using a clutch control logic based on the inertial load of the PTO implement, in accordance with an embodiment of the present disclosure. A clutch control logic (e.g., selected by the supervisory controller) may perform the method 110. The clutch control logic may be in any suitable form that implements the disclosed clutch control algorithm, such as an inertia-based clutch engagement controller. As discussed above in FIG. 4, for example, the supervisory controller may select an appropriate clutch control logic based on whether the mean of estimates of inertial loads is within a first range, a second range, or an N-1$^{th}$ range of inertial loads.

The clutch control logic determines (block 112) a first change in clutch speed or target PTO clutch output shaft speed increase per constant time duration based on the mean of estimates of inertial loads of the PTO implement (e.g., received from the supervisory controller). The mean of estimates of inertial loads ($J_{outavg}$) may be determined as described in block 84 of FIG. 4. To determine the first target PTO clutch output shaft speed increase per constant time duration, the clutch control logic may first determine a total PTO clutch engagement time ($T_{inertia}$) based on the mean of estimates of inertial loads ($J_{outavg}$) using the following equation:

$$T_{inertia} - t_2 = J_{outavg} \frac{w_{out}(T_{inertia}) - w_{out}(t_2)}{\tau_{clmax} - \tau_{cl}(t_2)} \quad (3)$$

where:

$\tau_{clmax}$ is the PTO clutch torque capacity; and $t_2$ is a time at which an average of the measured moments of inertia is determined (e.g., as shown in block 80 of FIG. 4).

The clutch control logic may then determine the first target PTO clutch output shaft speed increase per constant time ($\Delta w_{inertia}$) using the following equation:

$$\Delta w_{inertia} = \frac{(w_{out}(T_{inertia}) - w_{out}(t_2)) \cdot \Delta t}{T_{inertia} - t_2} \quad (4)$$

The clutch control logic also determines (block 114) a second change in clutch speed or target PTO clutch output shaft speed increase per constant time duration based on a threshold amount of energy that may be absorbed by the PTO clutch without significantly shortening its lifetime. For example, the threshold amount of energy may be associated with a maximum amount of energy (e.g., an energy capacity of the PTO clutch) that the PTO clutch may effectively absorb or that the PTO clutch may absorb without significantly shortening its lifetime. In some embodiments, the threshold amount of energy may be less than the energy capacity of the PTO clutch. For example, to determine the second change in clutch speed, the clutch control logic may first determine a PTO clutch engagement time ($T_{energy}$) based on the energy capacity of the PTO clutch ($E_{clmax}$) using the following equation:

$$T_{energy} - t_2 = \frac{2 \cdot (E_{clmax} - E_{cl}(t_2))}{(\tau_{cl}(t_2)(w_{in}(t_2) - w_{out}(t_2)) + \tau_{cl}(T_{energy})(w_{in}(T_{energy}) - w_{out}(T_{energy})))} \quad (5)$$

where:

$E_{clmax}$: PTO clutch energy capacity; and $E_{cl}$: energy absorbed by the PTO.

The clutch control logic may then determine the second change in clutch speed ($\Delta w_{energy}$) using the following equation:

$$\Delta w_{energy} = \frac{(w_{out}(T) - w_{out}(t_2)) \cdot \Delta t}{T_{energy} - t_2} \quad (6)$$

The clutch control logic then determines (block 116) a third change in clutch speed ($\Delta w_{desired}$) or target PTO clutch output shaft speed increase per constant time duration between the first change and the second change, such that $\Delta w_{inertia} < \Delta w_{desired} < \Delta w_{energy}$.

Figure 6:
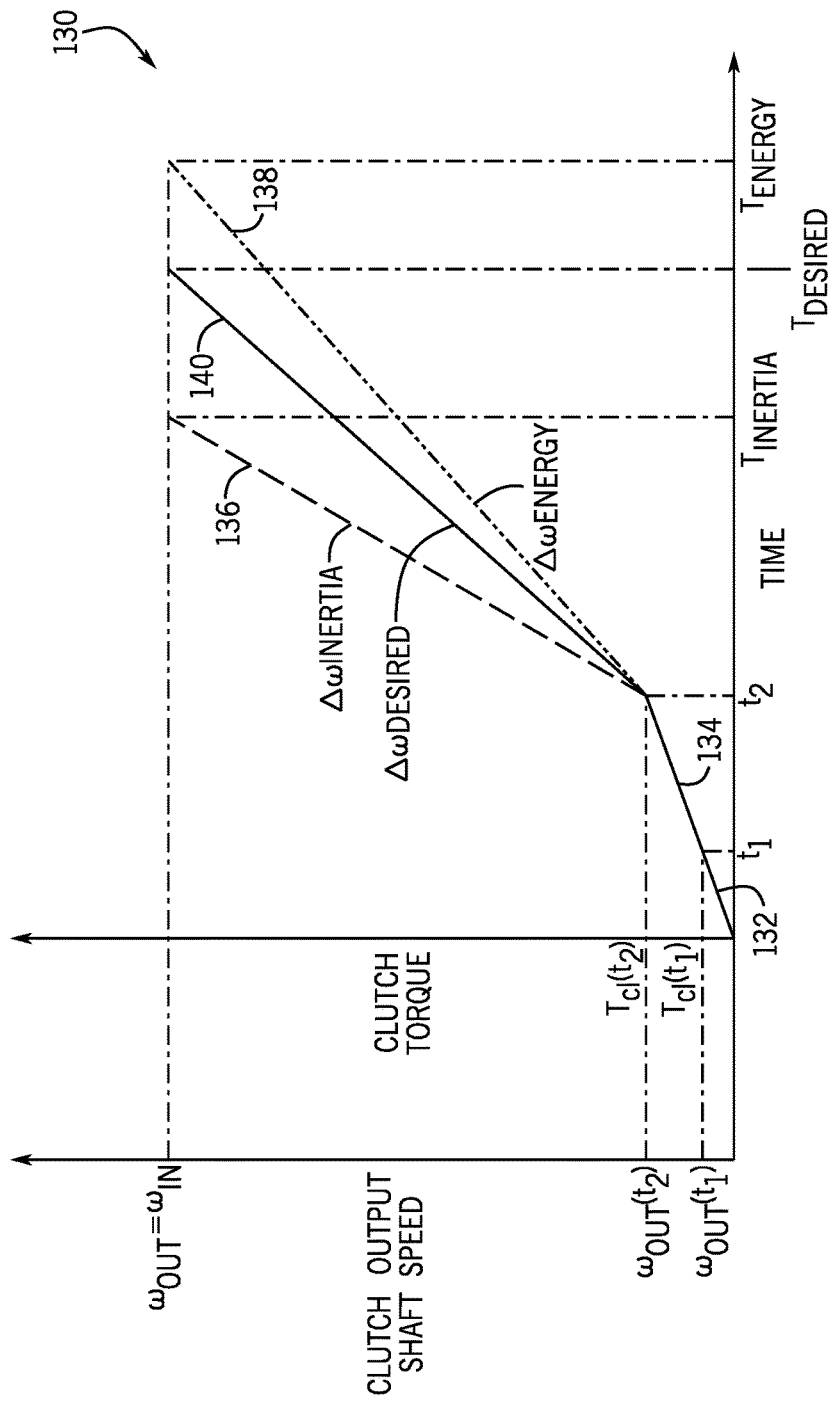
FIG. 6 is a graph of changes in clutch speed over time, in accordance with an embodiment of the present disclosure.

FIG. 6 is a graph 130 of changes in clutch speed over time, in accordance with an embodiment of the present disclosure. As illustrated, clutch speed 132 increases at the predetermined rate until the threshold output clutch speed is met or exceeded at time $t_1$ (as described in block 76 of FIG. 4). The clutch speed 134 then increases at the predetermined rate until the number of estimates of the inertial load of the PTO implement exceeds the threshold number of estimates at time $t_2$ (as described in block 80 of FIG. 4). As illustrated, the predetermined rates are equal. In some embodiments, the predetermined rates may be different. The clutch control logic determines the PTO clutch engagement time ($T_{inertia}$) based on the mean of estimates of inertial loads ($J_{outavg}$), and the first change in clutch speed ($\Delta w_{inertia}$) 136 based on the clutch engagement time ($T_{inertia}$). The clutch control logic determines the PTO clutch engagement time ($T_{energy}$) based on the energy capacity of the PTO clutch, and the second change in clutch speed ($\Delta w_{energy}$) 138 based on the clutch engagement time ($T_{inertia}$). The clutch control logic then determines the third change in clutch speed ($\Delta w_{desired}$) 140 between the first change and the second change, such that $\Delta w_{inertia} < \Delta w_{desired} < \Delta w_{energy}$. For example, the clutch control logic may determine the third change in clutch speed ($\Delta w_{desired}$) 140 to be halfway between the first change in clutch speed ($\Delta w_{inertia}$) 136 and the second change in clutch speed ($\Delta w_{energy}$) 138.

Returning to FIG. 5, the clutch control logic may control (block 118) the clutch (e.g., by adjusting current delivered to a solenoid of the PTO clutch) based on the third change in clutch speed ($\Delta w_{desired}$) 140. In some embodiments, the clutch control logic may convert the third change in clutch speed ($\Delta w_{desired}$) to a PTO clutch torque change (e.g., increase). The torque change (e.g., increase) may then be adjusted (e.g., reduced) based on a peak power capacity of the PTO clutch. That is, if the torque change may causes the PTO clutch to transfer more power than the peak power capacity of PTO the clutch, the clutch control logic may reduce the torque change. Limiting the power transferred by the PTO clutch may increase a lifetime of the PTO clutch. The torque change (e.g., increase) may also or alternatively be adjusted (e.g., reduced) to avoid stalling the engine of the work vehicle. Moreover, a total torque applied to the PTO clutch may be determined based on a current torque transmitted through the PTO clutch and the torque change (e.g., increase). The total torque may be adjusted (e.g., reduced) if the total torque is above a threshold (e.g., a maximum) torque amount (e.g., based on a real time clutch torque calculation). The clutch control logic may then convert the adjusted total torque to a clutch current adjustment, and may control the PTO clutch based on the clutch current adjustment. In this manner, the clutch control logic may provide a clutch current that avoids stalling the engine and/or increases a lifetime of the PTO clutch.

In some embodiments, the supervisory controller may perform the method 110 as a single PTO clutch control algorithm or PTO clutch control logic (e.g., replacing the determination of whether the inertial load is in a certain range as illustrated in blocks 86, 90, and 94 of the method 70). Moreover, the supervisory controller may perform the method 110 with or without the mean of estimates of inertial load. For example, the supervisory controller may perform the method 110 using alternative measurements, calculations, and the like, that determine the inertial load.

Figure 7:
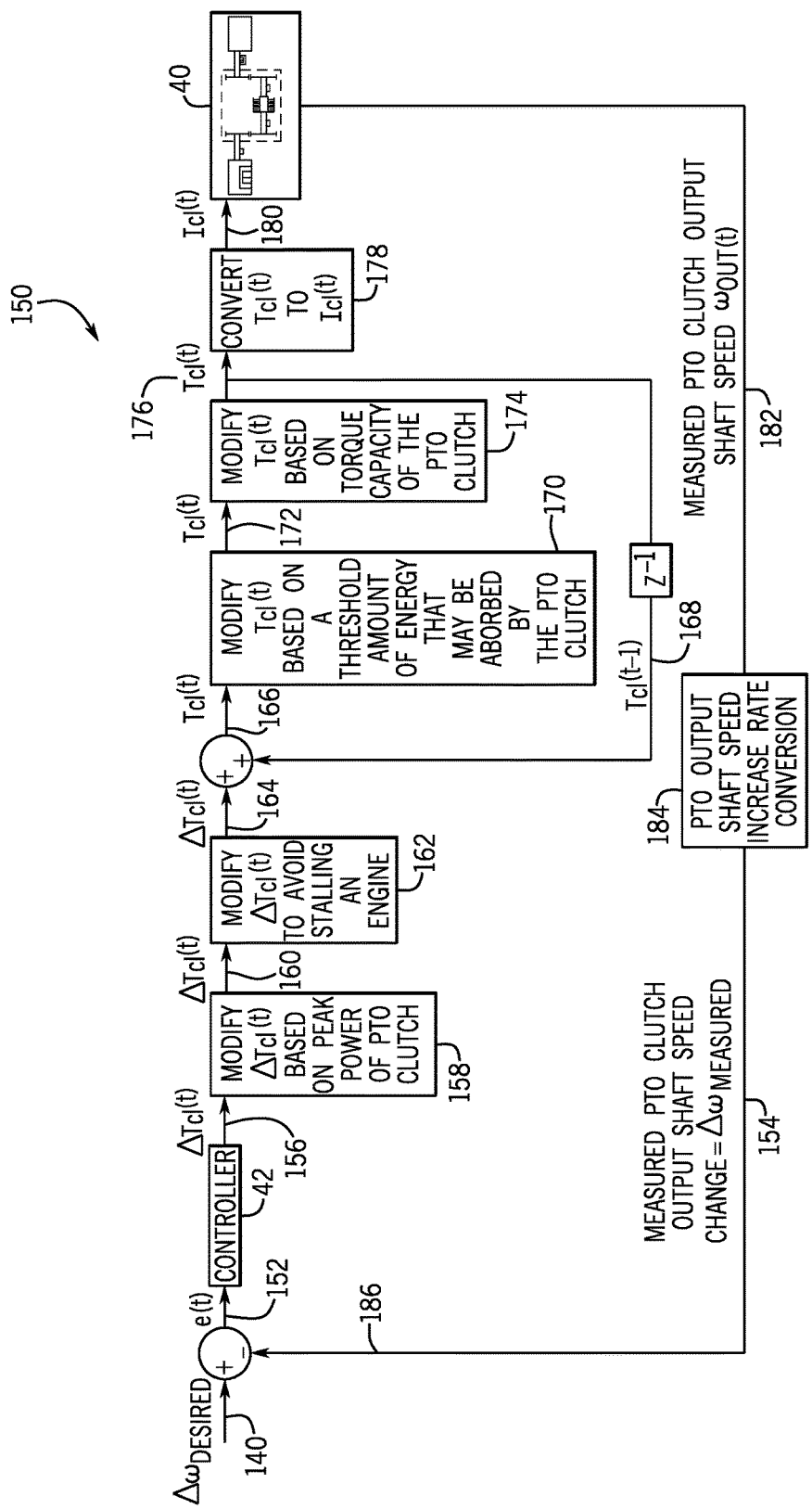
FIG. 7 is a flow diagram for implementing a desired change in PTO clutch output shaft speed using feedback of the desired change, in accordance with an embodiment of the present disclosure.

FIG. 7 is a flow diagram of a process 150 for implementing a desired change in PTO clutch output shaft speed ($\Delta w_{desired}$) (e.g., the third change in clutch speed) using feedback of the desired change (e.g., closed loop control), in accordance with an embodiment of the present disclosure. The supervisory controller may determine a difference (e.g., e(t)) 152 between the desired change in output shaft speed ($\Delta w_{desired}$) 140 and a measured change in output shaft speed ($\Delta w_{measured}$) 154. The supervisory controller may then convert the difference 152 to a first torque change ($\Delta \tau_{cl}(t)$) 156. The c supervisory controller may modify (e.g., decrease) 158 the first torque change 156 based on a peak power capacity of the PTO clutch, resulting in a second torque change 160. For example, if the first torque change 156 causes the PTO clutch to transfer more power than the peak power capacity, the supervisory controller may generate the second torque change 160 that is less than the first torque change 156. The supervisory controller may also modify (e.g., decrease) 162 the second torque change 160 to avoid stalling the engine of the work vehicle, resulting in a third torque change 164. For example, if the second torque change 160 is excessive such that it stalls the engine of the work vehicle, the supervisory controller may generate the third torque change 164 that is less than the second torque change 160.

The supervisory controller may then determine a first total torque ($\tau_{cl}(t)$) 166 based on the third torque change 164 and the current torque ($\tau_{cl}(t-1)$) 168 transmitted through the PTO clutch. The supervisory controller may modify (e.g., decrease) 170 the first total torque 166 to generate a second total torque 172 if the first total torque 166 causes the clutch energy to exceed the threshold amount of energy of (e.g., may be absorbed by) the PTO clutch. The supervisory controller may also modify (e.g., decrease) 174 the second total torque 172 to generate a third total torque 176 if the second total torque 172 is above a torque capacity of the PTO clutch.

The supervisory controller may then convert 178 the third total torque 176 to a clutch current ($I_{cl}(t)$) 180. The supervisory controller may send the clutch current 180 to the control system 40 to be applied. The supervisory controller may measure a resulting PTO clutch output shaft speed ($w_{out}(t)$) 182 (e.g., using the sensor that measures speed of the PTO output shaft). The supervisory controller may then determine 184 the measured PTO clutch output shaft speed change 154 based on the measured PTO clutch output shaft speed 182. The supervisory controller may feedback 186 the measured PTO clutch output shaft speed change 154 to determine the difference 152 between the desired change in output shaft speed 140 and the measured change in output shaft speed 154. In this manner, the supervisory controller may more accurately control the change in PTO clutch output shaft speed 140 by feeding back the resulting measured change in output shaft speed 154.

While only certain features of the invention have been illustrated and described herein, many modifications and changes will occur to those skilled in the art. It is, therefore, to be understood that the appended claims are intended to cover all such modifications and changes as fall within the true spirit of the invention.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system of a work vehicle, comprising:
   a power takeoff (PTO) system comprising:
      a PTO clutch comprising a clutch control solenoid valve configured to regulate supply of hydraulic fluid to the PTO clutch and control engagement and disengagement of the PTO clutch based on a clutch current; and
      a PTO output shaft coupled to the PTO clutch, wherein the PTO output shaft, in operation, is coupled to and drives a PTO implement; and
   a controller comprising a supervisory control system communicatively coupled to the PTO clutch, wherein the supervisory control system comprises a first clutch control logic configured for a first range of inertial loads of the PTO implement and a second clutch control logic configured for a second range of inertial loads of the PTO implement, wherein the supervisory control system, in operation:
   determines an output clutch speed of the PTO clutch;
   adjusts the clutch current of the PTO clutch at a predetermined rate by at least increasing the clutch current of the PTO clutch at the predetermined rate when the output clutch speed is less than a threshold output clutch speed;
   estimates an inertial load of the PTO implement and adjusts the clutch current for one or more times at a time interval;
   selects the first clutch control logic when the estimate is within the first range of inertial loads; and
   selects the second clutch control logic when the estimate is within the second range of inertial loads.

2. The system of claim 1, wherein estimating the inertial load of the PTO implement and adjusting the clutch current for the one or more times comprises:
   determining a plurality of estimates of the inertial load of the PTO implement; and
   adjusting the clutch current after determining each estimate of the plurality of estimates of the inertial load of the PTO implement.

3. The system of claim 2, wherein estimating the inertial load of the PTO implement and adjusting the clutch current for the one or more times comprises determining a mean of the plurality of estimates of the inertial load of the PTO implement.

4. The system of claim 1, wherein the output clutch speed is determined based at least on signal received from a sensor communicatively coupled to the PTO output shaft.

5. The system of claim 1, wherein estimating the inertial load of the PTO implement and adjusting the clutch current for the one or more times comprises:
   determining a difference between a measured clutch output shaft speed at a certain time during engagement and a measured clutch output shaft speed at a time of an immediately previous time interval;
   dividing the time interval by the difference; and
   multiplying a result of dividing the time interval by a clutch torque at the certain time during engagement.

6. The system of claim 1, wherein the supervisory control system comprises software stored in a memory device of the controller.

7. A tangible, non-transitory, machine-readable-medium, comprising machine-readable instructions to:
   determine an output clutch speed of a power takeoff (PTO) clutch of a work vehicle;
   adjust a clutch current of the PTO clutch at a predetermined rate;
   estimate an inertial load of a PTO implement and adjust the clutch current for one or more times at a time interval by at least:
      determining a difference between a measured clutch output shaft speed at a time during engagement and a measured clutch output shaft speed at a time of an immediately previous time interval;
      dividing the time interval by the difference; and
      multiplying a result of dividing the time interval by a clutch torque at the time during engagement;
   select a first clutch control algorithm configured for a first range of inertial loads when the estimate is within the first range of inertial loads; and
   select a second clutch control algorithm configured for a second range of inertial loads when the estimate is within the second range of inertial loads.

8. The machine-readable-medium of claim 7, wherein estimating the inertial load of the PTO implement and adjusting the clutch current for the one or more times comprises:
   determining a plurality of estimates of the inertial load of the PTO implement; and
   adjusting the clutch current after each estimate of the plurality of estimates of the inertial load of the PTO implement is determined.

9. The machine-readable-medium of claim 8, wherein estimating the inertial load of the PTO implement and adjusting the clutch current for the one or more times comprises determining a mean of the plurality of estimates of the inertial load of the PTO implement.

10. The machine-readable-medium of claim 8, wherein estimating the inertial load of the PTO implement and adjusting the clutch current for the one or more times comprises determining a median of the plurality of estimates of the inertial load of the PTO implement.

11. The machine-readable-medium of claim 8, wherein estimating the inertial load of the PTO implement and adjusting the clutch current for the one or more times comprises determining a maximum of the plurality of estimates of the inertial load of the PTO implement.

12. The machine-readable-medium of claim 8, comprising machine-readable instructions to select a third clutch control algorithm configured for a third range of inertial loads when the estimate is within the third range of inertial loads.

13. A method for controlling power takeoff (PTO) clutch engagement, comprising:
   determining an output clutch speed;
   adjusting a clutch current at a predetermined rate;
   estimating an inertial load of a PTO implement and adjusting the clutch current for one or more times at a time interval by at least:
      increasing the clutch current for the one or more time intervals; and
      determining a mean of the plurality of estimates of the inertial load of the PTO implement; and
   selecting a clutch control logic of a plurality of clutch control logics based on the estimate of the inertial load of the PTO implement.

14. The method of claim 13, wherein estimating the inertial load of the PTO implement and adjusting the clutch current for the one or more times comprises:
   determining a difference between a measured clutch output shaft speed at a certain time during engagement and a measured clutch output shaft speed at a time of an immediately previous time interval;
   dividing the time interval by the difference; and
   multiplying a result of dividing the time interval by a clutch torque at the time during engagement.

15. The method of claim 13, wherein the clutch control logic has an input comprising the inertial load of the PTO implement.

16. The method of claim 13, wherein selecting the clutch control logic configured for the inertial load of the PTO implement comprises:
   selecting a first set of parameters for a clutch control algorithm, such that the clutch control algorithm using the first set of parameters is configured for a first range of inertial loads when the estimate is within the first range of inertial loads; and
   selecting a second set of parameters for the clutch control algorithm, such that the clutch control algorithm using the second set of parameters is configured for a second range of inertial loads when the estimate is within the second range of inertial loads.

* * * * *